United States Patent
Savoj (10) Patent No.: US 8,818,267 B2
(45) Date of Patent: Aug. 26, 2014

(54) NFC TRANSCEIVER UTILIZING COMMON CIRCUITRY FOR ACTIVE AND PASSIVE MODES

(75) Inventor: Jafar Savoj, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 196 days.

(21) Appl. No.: 13/282,359

(22) Filed: Oct. 26, 2011

(65) Prior Publication Data

US 2013/0109306 A1    May 2, 2013

(51) Int. Cl.
*H04B 5/00*    (2006.01)

(52) U.S. Cl.
USPC ............. 455/41.1; 455/41.2; 455/83; 455/19

(58) Field of Classification Search
CPC ..... G06F 1/1683; G06F 1/1692; G06F 1/575; A63F 13/12; H04W 12/06
USPC ......... 455/41.1; 323/269, 273, 274, 281, 282, 323/303
See application file for complete search history.

(56) References Cited

U.S. PATENT DOCUMENTS

| | | | |
|---|---|---|---|
| 6,084,385 A * | 7/2000 | Nair | 323/273 |
| 6,462,647 B1 | 10/2002 | Roz | |
| 6,944,424 B2 | 9/2005 | Heinrich et al. | |
| 7,786,868 B2 | 8/2010 | Forster | |
| 2009/0101716 A1 * | 4/2009 | Mani et al. | 235/441 |
| 2010/0102673 A1 | 4/2010 | Leukkunen | |
| 2011/0259953 A1 * | 10/2011 | Baarman et al. | 235/375 |

FOREIGN PATENT DOCUMENTS

| | | |
|---|---|---|
| EP | 1280099 A1 | 1/2003 |
| EP | 1786116 A1 | 5/2007 |
| GB | 2292866 A | 3/1996 |
| GB | 2456850 A | 7/2009 |
| WO | 2009066211 A2 | 5/2009 |

OTHER PUBLICATIONS

International Search Report and Written Opinion—PCT/US2012/062257—ISA/EPO—Feb. 21, 2013.

* cited by examiner

*Primary Examiner* — Fayyaz Alam
*Assistant Examiner* — Max Mathew
(74) *Attorney, Agent, or Firm* — William M. Hooks (57) ABSTRACT

Exemplary embodiments are directed to a transceiver. A transceiver may include a rectifier coupled to a capacitor. The transceiver may further include a power management module coupled to the capacitor, wherein the capacitor is configured as a power supply capacitor in a first mode and a rectifier capacitor in a second, different mode.

25 Claims, 12 Drawing Sheets

NFC TRANSCEIVER UTILIZING COMMON CIRCUITRY FOR ACTIVE AND PASSIVE MODES

BACKGROUND

1. Field

The present invention relates generally to near field communication (NFC). More specifically, the present invention relates to an NFC transceiver having a reduced pin count and bill of material compared to conventional NFC transceivers.

2. Background

Near Field Communication (NFC) is wireless technology that can enable for short range exchange of information between two or more devices. Devices capable of NFC can simplify presence-oriented transactions to enable for rapid and more secure exchange of information, for example, as in purchases for goods and services, or the exchange of information therein.

As a person skilled in the art will appreciate and understand, NFC technologies communicate over magnetic field induction, where at least two loop antennas are located within each other's "near field," effectively forming an air-core transformer that operates within a globally available and unlicensed radio frequency which, as indicated, is an industrial, scientific and medical (ISM) band of 13.56 MHz, with a band width of almost two (2) MHz.

As will be appreciated by a person having ordinary skill in the art, an NFC transceiver may be configured for operation in either a passive mode or an active mode. Conventional NFC transceivers, which are configured for operation in both of an active mode and a passive mode, utilize a first capacitor and an associated contact pad for the active mode (i.e., for supply bypass) and a second capacitor and a second associated contact pad for the passive mode (i.e., for energy storage). These capacitors, which are external to an integrated circuit including NFC circuitry, are large and increase the bill of materials for an NFC transceiver.

A need exists for an enhanced NFC transceiver having a reduced pad count and bill of materials. More specifically, a need exists for devices and methods for reducing the pad count and bill of materials for an NFC transceiver by sharing common circuitry in each of a passive mode and an active mode.

DETAILED DESCRIPTION

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

NFC is a communication standard that enables wireless communication devices, such as cellular telephones, SmartPhones, and personal digital assistants (PDAs) to establish peer-to-peer (P2P) networks. NFC may enable electronic devices to exchange data and initiate applications automatically when they are brought in close proximity, for example ranges from less than a centimeter to a distance of about 10 cm. As non-limiting examples, NFC may enable downloading of images stored in a digital camera to a personal computer, downloading of audio and video entertainment to portable devices, or downloading of data stored in a SmartPhone to a personal computer or other wireless device. NFC may be compatible with smart card technologies and may also be utilized to enable purchase of goods and services. In an exemplary embodiment, the frequency used for NFC is centered at about 13.56 MHz.

An NFC transceiver may include circuitry to impedance match to an antenna or other circuitry within a coupling element. The NFC transceiver may also include suitable logic, circuitry, processors, code, or combinations thereof to enable the reception and transmission of NFC signals, for which the carrier frequency of the received signal is in the NFC frequency band. Data may be modulated on the carrier frequency.

Conventional NFC may be based on Radio-Frequency Identification (RFID) technology that uses field induction to enable communication between electronic devices in close proximity. This can enable users to perform intuitive, safe, contactless transactions. Conventional state-of-the art NFC may operate at 13.56 MHz and transfers data at up to 424 Kbits/second. Of course, improvements to NFC technology may result in differing frequency(s), differing throughput values, or both. Communication between two or more NFC-compatible devices may occur when the devices are brought within a short distance from one another and maybe compatible with other known wireless technologies such as Bluetooth or Wi-Fi, for example.

Currently, there are two principal modes of operation available under present NFC standards: active and passive (i.e., powered by field). In active mode, a device may generate its own radio field to transmit data. In passive mode, one device may generate a radio field, while the other uses load modulation to transfer data. The passive mode of communication is often useful for limited power devices, such as mobile phones and PDAs, which need to minimize energy use. It may also prevent disruption of NFC communication when the device battery runs out.

In the various exemplary embodiments described herein, the term NFC is understood to encompass any now or future known wireless or near-proximity communication protocols or systems that facilitate the short-range wireless transfer of information, and is understood to not be limited to current standards or protocols promulgated by an NFC standards body or organization. Accordingly, NFC is understood to be applied herein as a generic sense of the term.

As will be understood by a person having ordinary skill in the art, NFC transceivers may include a contact pad and a supply capacitor dedicated to a power supply for an active mode and another contact pad and a rectifier capacitor dedicated to a rectifier for a passive mode.

Figure 1:
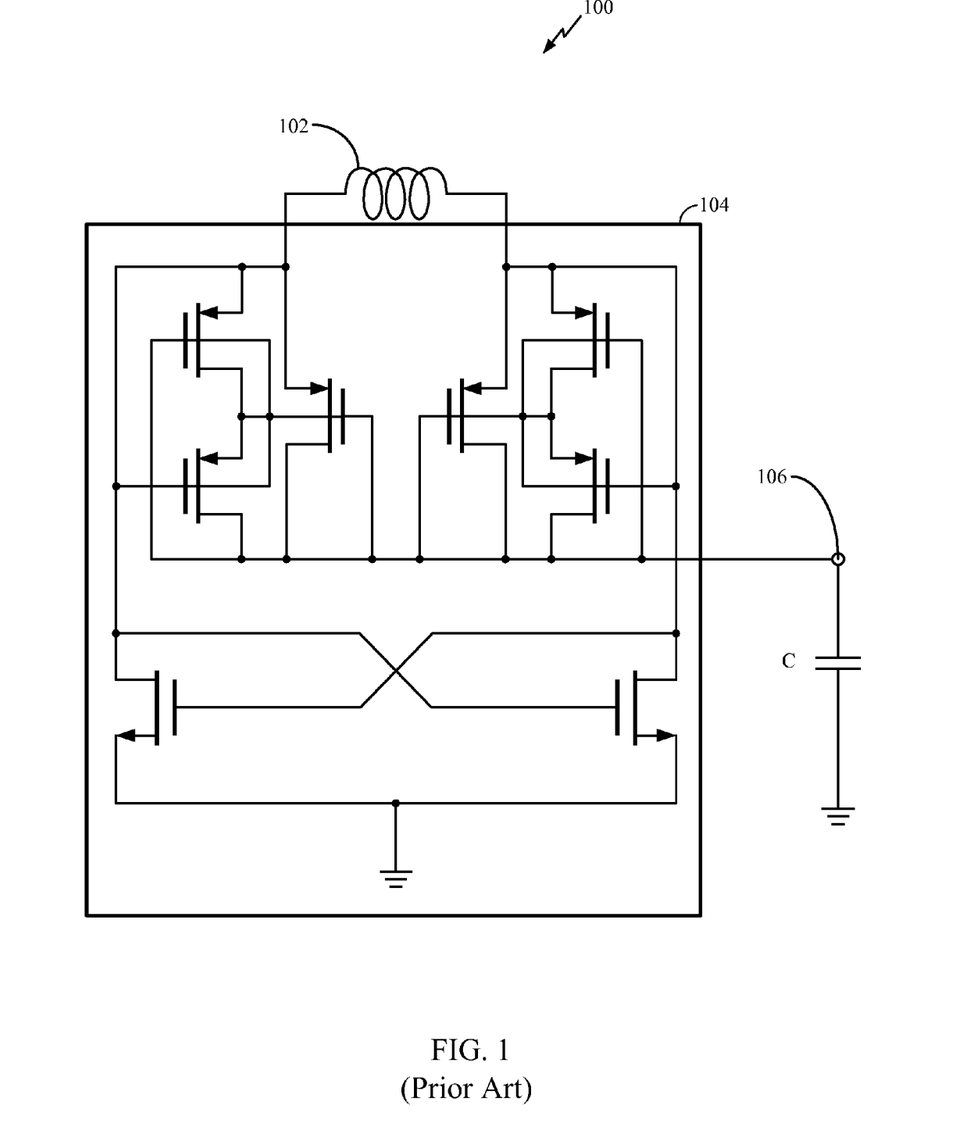
FIG. 1 illustrates a conventional NFC energy harvesting circuit.

FIG. 1 is an illustration of a conventional NFC energy harvesting circuit 100 configured for energy harvesting in a passive mode. NFC transceiver system 100 includes an antenna 102, a pad 106, and a capacitor C, which is external to an associated chip 104. As will be appreciated by a person having ordinary skill in the art, energy harvesting utilizing NFC transceiver system 100 requires a large external capacitor (i.e., capacitor 106), which requires a dedicated pad (i.e., pad 106) and increases the bill of materials (BOM).

Figure 2A:
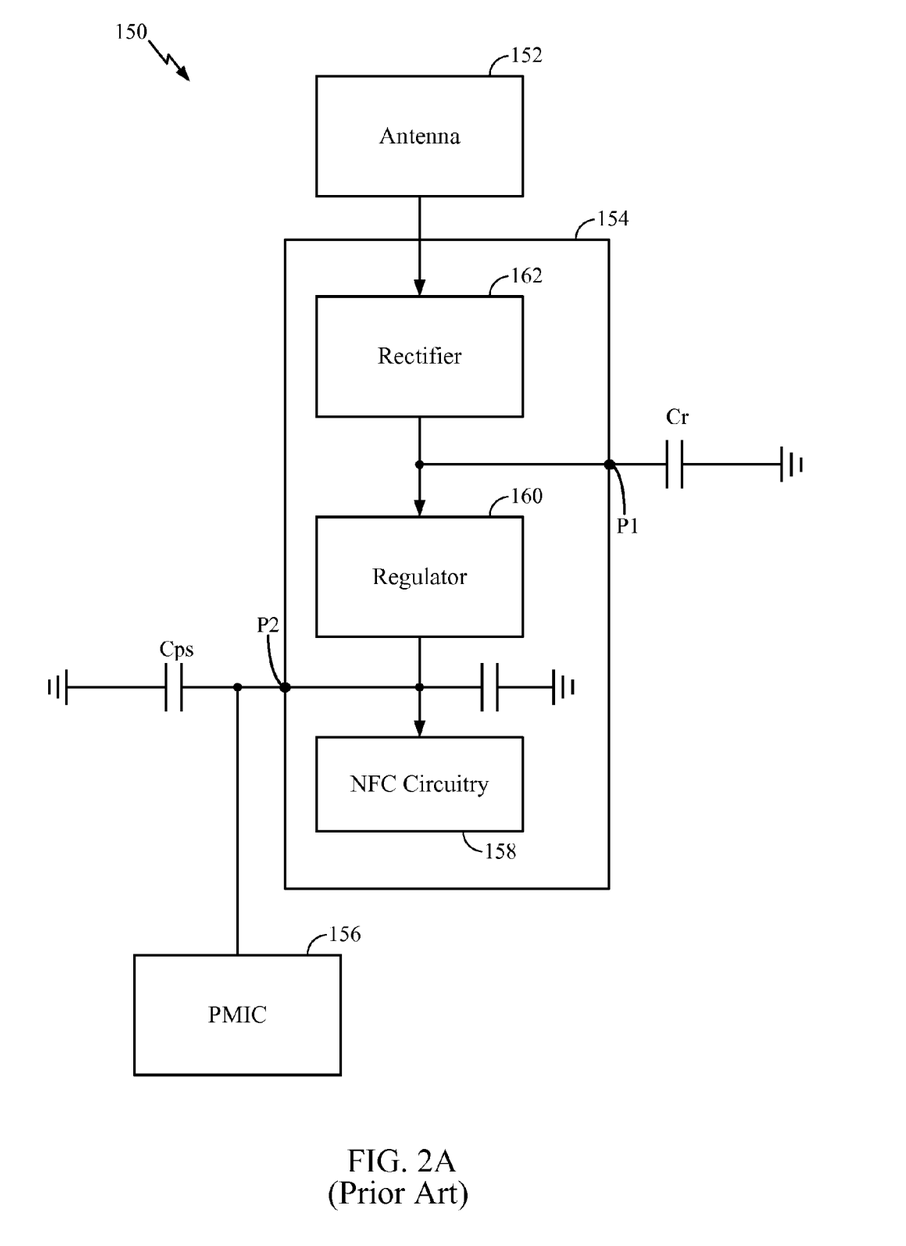
FIG. 2A illustrates a conventional NFC transceiver including energy harvesting circuitry.

FIG. 2A depicts an NFC transceiver 150 configured for operation in either an active mode or a passive mode. NFC transceiver 150 includes an antenna 152, a rectifier 162, a regulator 160, a power management integrated circuit (PMIC) 156, and NFC circuitry 158. Rectifier 162, regulator 160, and NFC circuitry 158 are integrated on a chip 154, and PMIC 156 is external to chip 154. NFC transceiver 150 further includes a rectifier capacitor Cr, which is utilized for energy harvesting in the passive mode (i.e., power by field mode), and a power supply capacitor Cps, which is utilized in the active mode. As illustrated in FIG. 2A, rectifier capacitor Cr and power supply capacitor Cps are each external to chip 154 and are each connected to the NFC circuit through respective pads P1 and P2. Stated another way, capacitor Cr and pad P1 are dedicated to an energy harvester (e.g., rectifier 162) in the passive mode and capacitor Cps and pad P2 are dedicated to a power supply in the active mode.

Figure 2B:
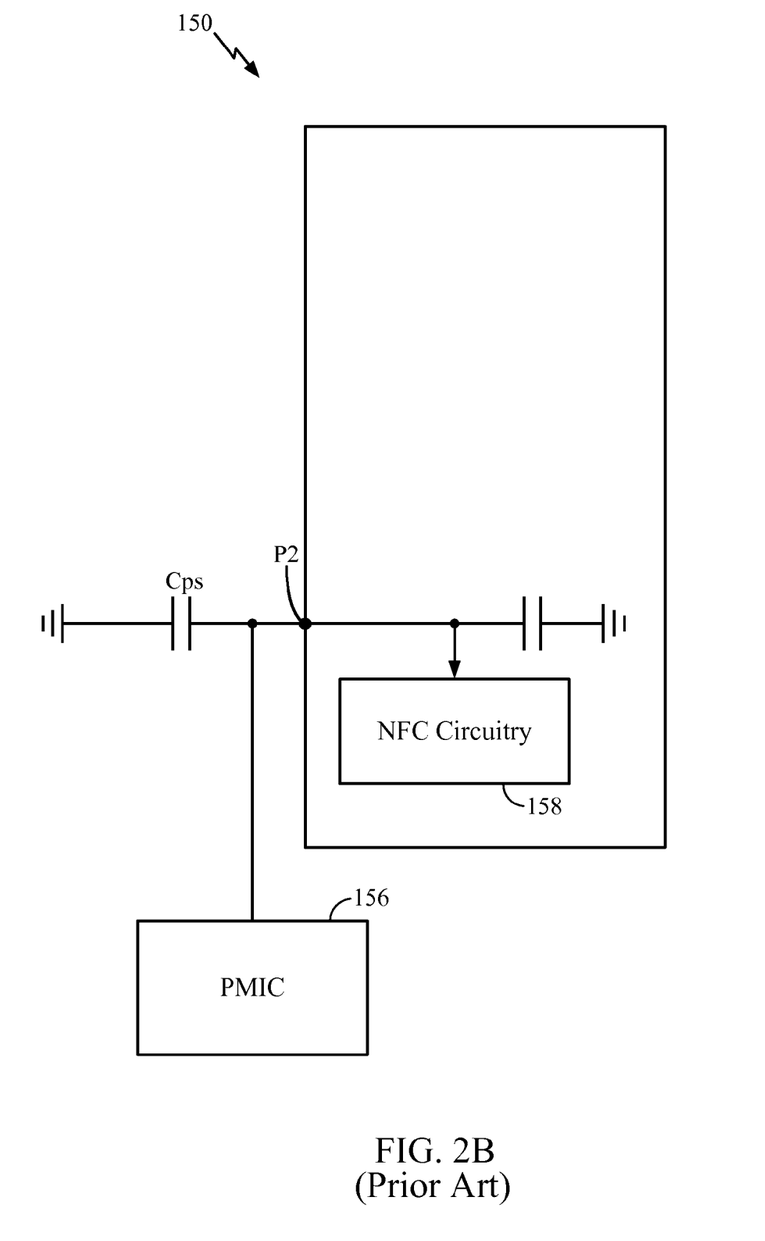
FIG. 2B depicts the conventional NFC transceiver of FIG. 2A operating in an active mode.

FIG. 2B illustrates active components of NFC transceiver 150 while in an active mode of operation. As illustrated in FIG. 2B, PMIC 156 is coupled to power supply capacitor Cps. Further, PMIC 156 is coupled, via pad P2, to NFC circuitry 158. Accordingly, energy may be conveyed from PMIC 156 to NFC circuitry 158, and power supply capacitor Cps may provide noise filtering.

Figure 2C:
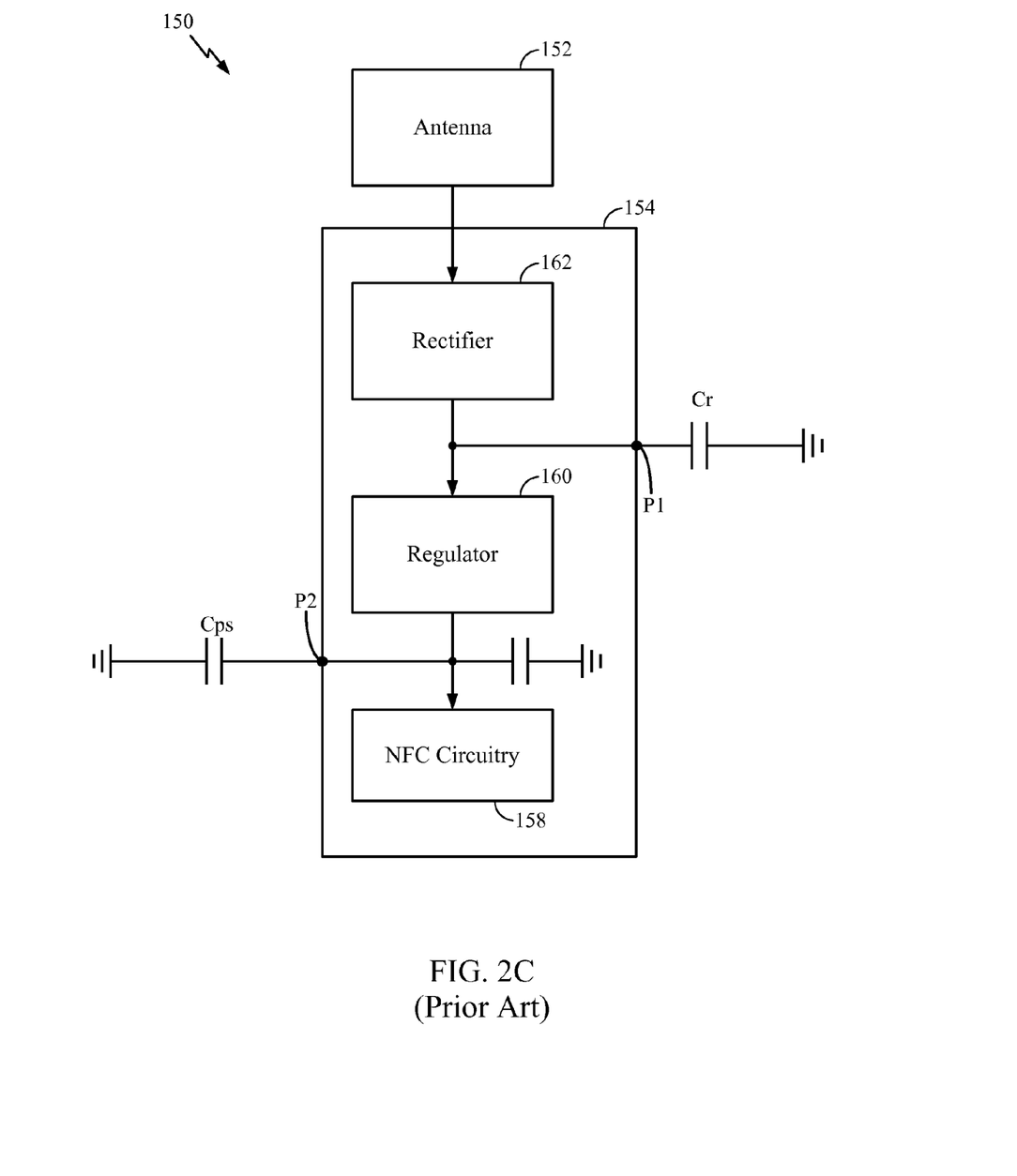
FIG. 2C depicts the conventional NFC transceiver of FIG. 2A operating in a passive mode.

FIG. 2C illustrates active components of NFC transceiver 150 while in a passive mode of operation. As illustrated in FIG. 2C, antenna 152 is coupled to rectifier capacitor Cr via rectifier 162. Accordingly, energy received by NFC system 150 may be conveyed to and stored within rectifier capacitor Cr.

Exemplary embodiments of the present invention, as described herein, are related to methods and devices for utilizing a common circuitry for active and passive modes. More specifically, exemplary embodiments are directed to utilizing a common capacitor for active and passive NFC modes. Furthermore, it is noted that exemplary embodiments may utilize a common pad and a common supply line for the active and passive NFC modes.

Figure 3:
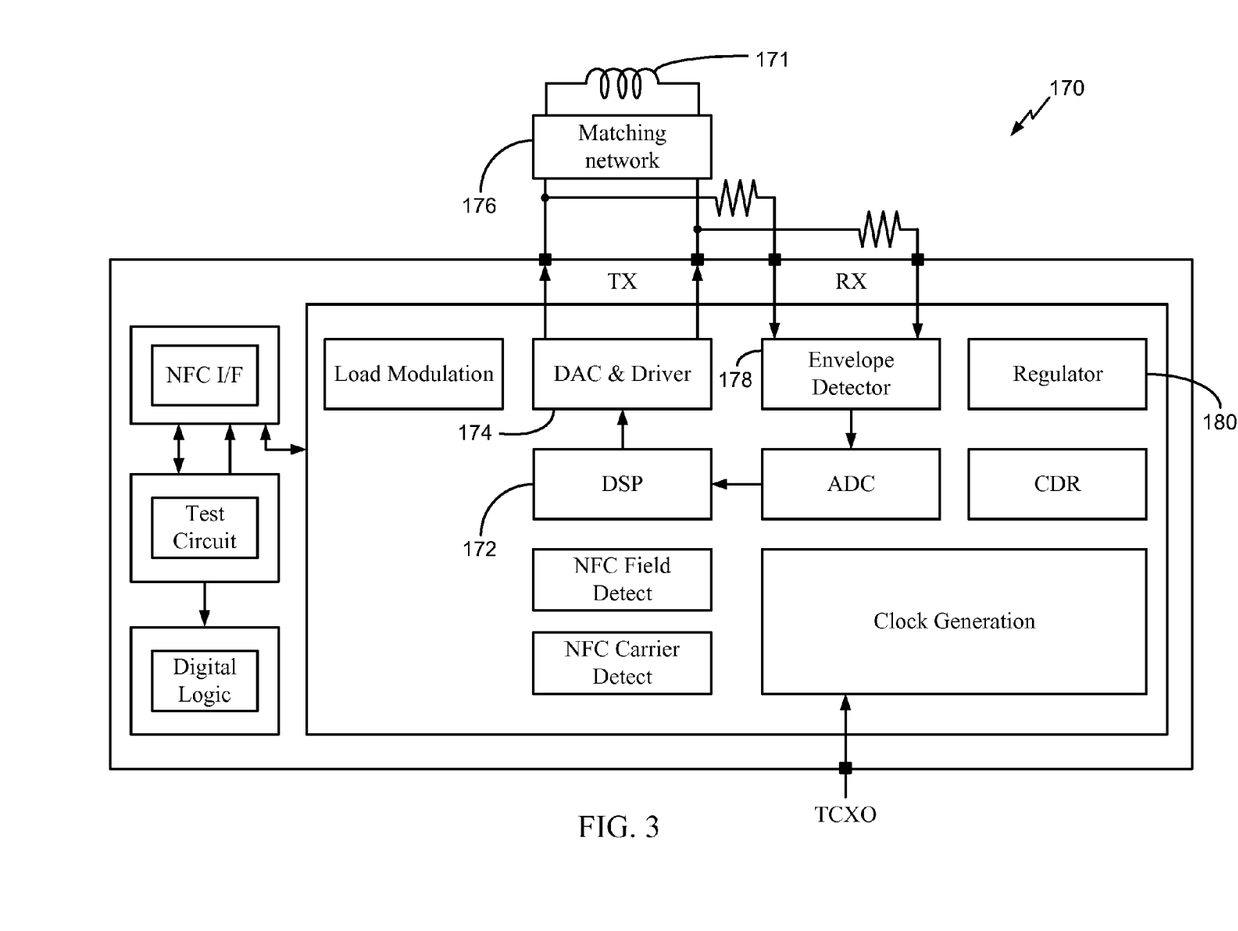
FIG. 3 illustrates an NFC system, according to an exemplary embodiment of the present invention.

FIG. 3 is a block diagram of an NFC transceiver 170, which is configured to support both active and passive modes, as mentioned above. NFC transceiver 170 includes, among other components, an antenna 171, a digital signal processor (DSP) 172, which is also commonly referred to as a baseband modem, a digital-to-analog converter (DAC) & driver module 174, and a matching network 176. It is noted that DAC and driver module 174 may be configured for load modulation and, thus, a separate load modulation module may not be required. NFC transceiver 170 further includes a regulator 180, which may comprise a rectifier, or NFC transceiver 170 may include a rectifier (not shown in FIG. 4), which is separate from regulator 180.

Figure 4A:
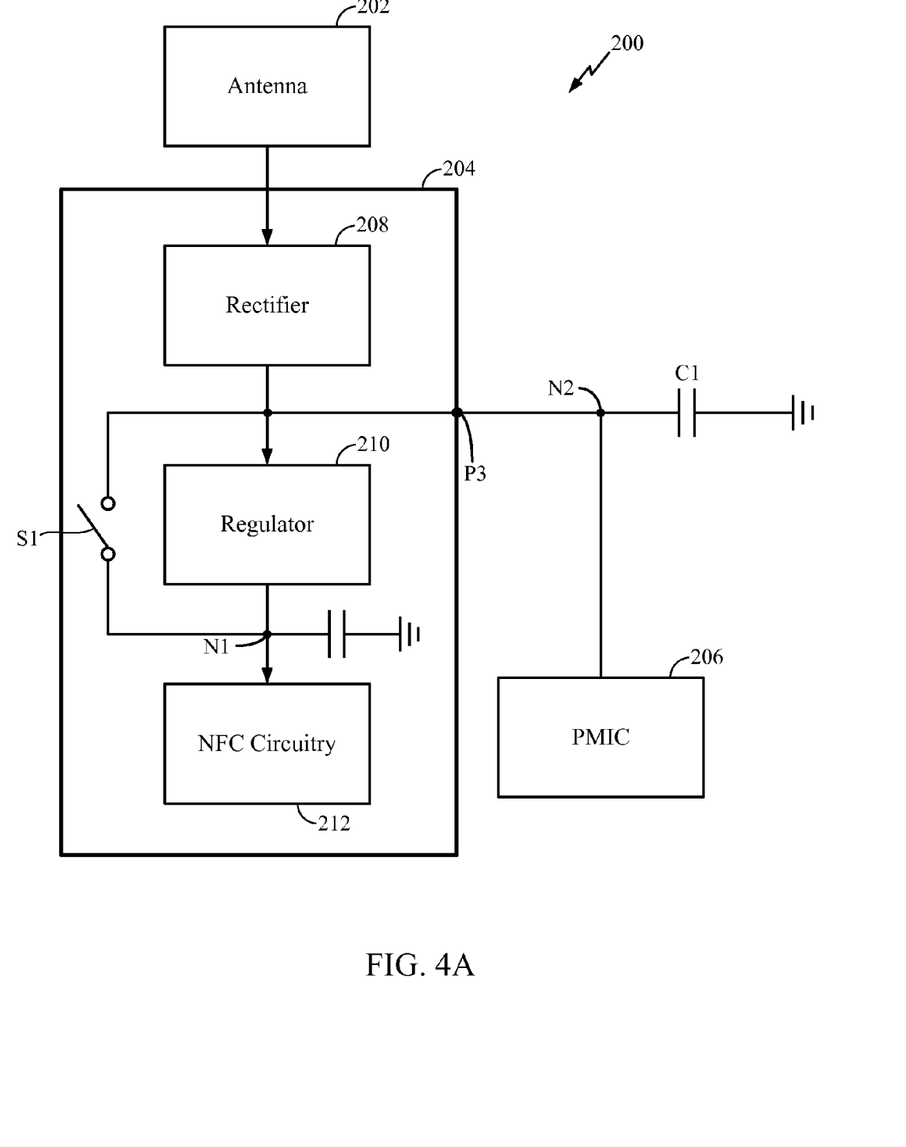
FIG. 4A illustrates an NFC transceiver, according to an exemplary embodiment of the present invention.

FIG. 4A is an illustration of an NFC transceiver 200, in accordance with an exemplary embodiment of the present invention. NFC transceiver 200 includes an antenna 202, a rectifier 208, a regulator 210, and NFC circuitry 212. As illustrated in FIG. 5, regulator 210 is coupled between rectifier 208 and NFC circuitry 212. Further, antenna 202 is coupled to rectifier 208. Each of rectifier 208, regulator 210, and NFC circuitry 212 are integrated on chip 204. NFC transceiver 200 further includes a PMIC 206 and a capacitor C1, each of which are external to chip 204. Moreover, NFC transceiver 200 includes a switching element S1 that is configured to selectively couple a node N1 to a node N2. Accordingly, while switching element S1 is in a closed configuration, capacitor C1 is coupled to node N1. On the other hand, while switching element S1 is in an open configuration, capacitor C1 is decoupled from node N1. It is noted that PMIC 206 and capacitor C1 are each coupled to chip 204 through a common contact pad P3. It is noted that switching element S1 may comprise any suitable switching element, such as a transistor.

As illustrated in FIG. 4A, switching element S1 is in an open configuration and, thus, NFC system 200 is operating in a passive mode. As noted above, in a passive mode of operation, energy received by NFC system 200 is conveyed to and stored within capacitor C1.

Figure 4B:
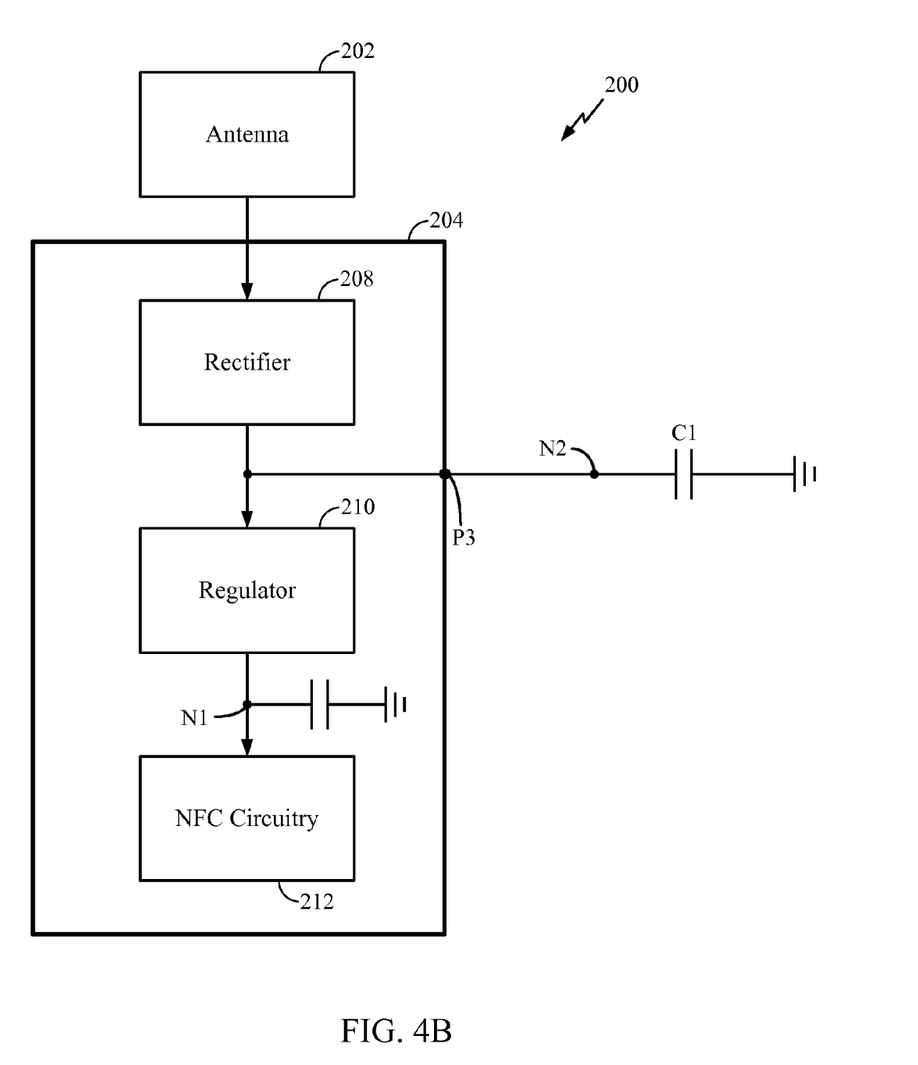
FIG. 4B depicts the NFC transceiver of FIG. 4A operating in a passive mode, according to an exemplary embodiment of the present invention.

FIG. 4B illustrates active components of NFC transceiver 200 while in a passive mode of operation. As illustrated in FIG. 4B, antenna 202 is coupled to capacitor C1 via pad P3. More specifically, antenna 202 is coupled to capacitor C1 via rectifier 208 and pad P3. Accordingly, energy, which is received by NFC transceiver 200, may be conveyed from antenna 202 to and stored within capacitor C1.

Figure 5A:
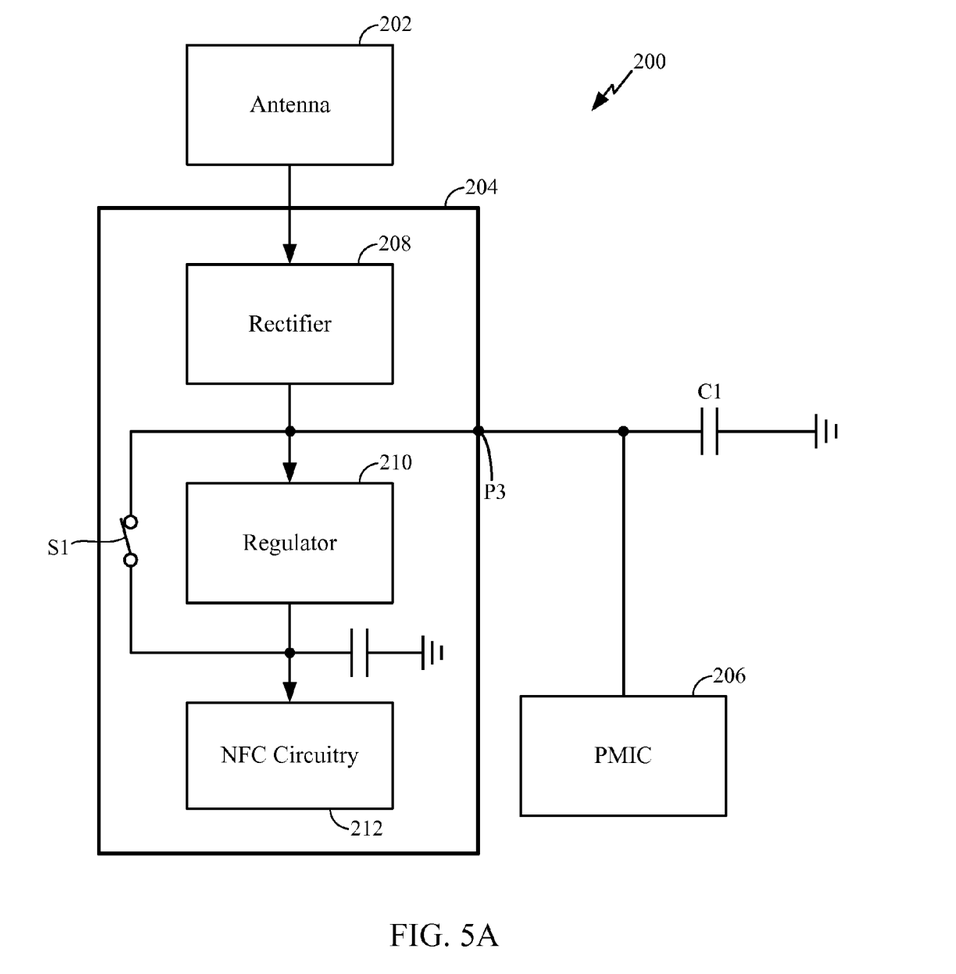
FIG. 5A is another illustration of the NFC transceiver of FIG. 4B, according to an exemplary embodiment of the present invention.

FIG. 5A is a diagram of NFC transceiver 200 wherein switching element S1 is in a closed configuration and, thus, NFC transceiver 200 is operating in an active mode. As noted above, in an active mode of operation, PMIC 206 is coupled to capacitor C1. Further, PMIC 206 is coupled to NFC circuitry 212 via pad P3. Accordingly, energy may be conveyed from PMIC 206 to NFC circuitry 212. Furthermore, capacitor C1 may provide filtering while in the active mode.

Figure 5B:
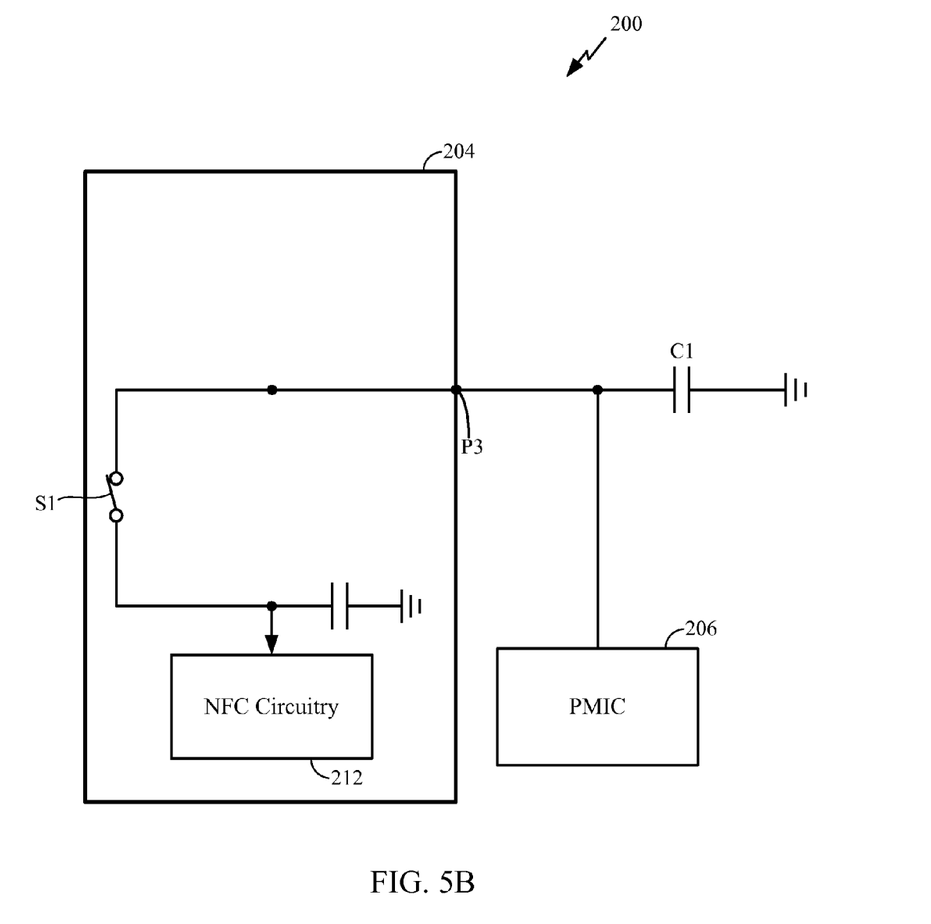
FIG. 5B depicts the NFC transceiver of FIGS. 4A and 5A operating in an active mode, according to an exemplary embodiment of the present invention.

FIG. 5B illustrates active components of NFC transceiver 200 while in an active mode of operation. As illustrated in FIG. 5B, PMIC 206 is coupled to capacitor C1 and, is further coupled to NFC circuitry 212. More specifically, PMIC 206 is coupled to NFC circuitry 212 via switching element S1 and pad P3. Accordingly, power may be conveyed from PMIC 206 to NFC circuitry 212 in an active mode of operation. Furthermore, filtering (i.e., noise filtering) may be provided by capacitor C1 in the active mode.

Figure 6:
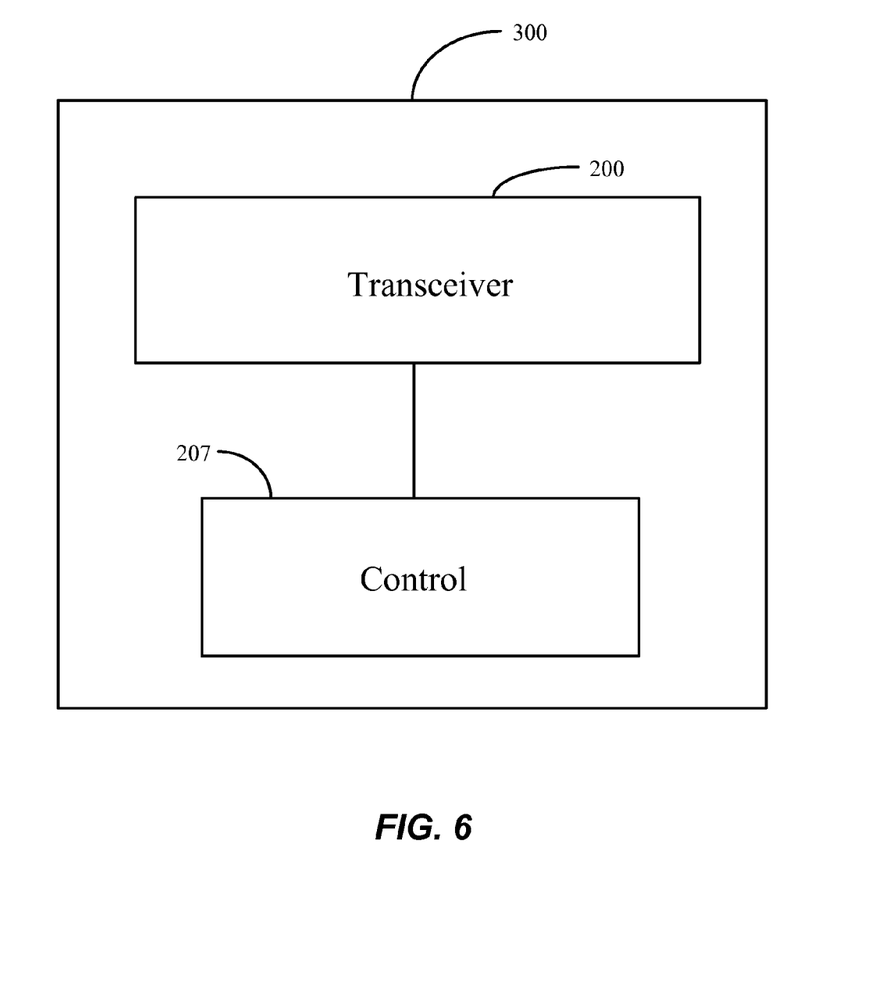
FIG. 6 is a block diagram of a device including an NFC transceiver, in accordance with an exemplary embodiment of the present invention.

FIG. 6 is a block diagram of a NFC device 300, according to an exemplary embodiment of the present invention. NFC device 300 includes NFC transceiver 200 and a control module 304, which may comprise, for example only, a processor, a controller, or the like. Control module 207 may be configured to convey one or more control signals to NFC system 200 for controlling a configuration of at least one switching element (e.g., switching element S1) therein. Although control module 207 is illustrated as a separate and distinct component from NFC transceiver 200, NFC transceiver may include control module 207.

A contemplated operation of NFC transceiver 200 will now be described with reference to FIGS. 3-6. In one mode of operation (e.g., a passive (power-by-field) mode of operation), switch S1 may be in an open configuration (see FIG. 4A). While in this mode, a field generated by another device (not shown in the FIGS.) may be received by NFC transceiver 200. Further, NFC transceiver 200 may be configured for performing load modulation to transfer data back to the other device. Additionally, upon receiving the field from the other device, energy may be stored in capacitor C1. More specifically, energy from the received field may be conveyed from antenna 202 to capacitor C1 via rectifier 208, pad P3, and node N2. It is noted that in this mode of operation, capacitor C1 functions as a rectifier capacitor. In addition, the field may be received by NFC circuitry 212 via rectifier 208 and regulator 210.

Another contemplated operation of NFC transceiver 200 will now be described with reference to FIGS. 3-6. In another mode of operation (e.g., an active mode of operation), switch S1 may be in a closed configuration (see FIG. 5A). While in this mode, NFC transceiver 200 may generate its own radio field to transmit data. Further, in this mode, energy may be conveyed from PMIC 206 to NFC circuitry 212. More specifically, energy may be conveyed from PMIC 206 to NFC circuitry via node N2, pad P3, and node N1. It is noted that a signal conveyed from PMIC 206 is already regulated and, therefore, it is not required for the signal conveyed from PMIC 206 to pass through regulator 210 (i.e., regulator 210 is bypassed). Moreover, in this mode of operation, capacitor C1, which functions as a power supply capacitor, may provide filtering (e.g., noise filtering) for PMIC 206. It is noted that, in this mode, capacitor C1 and possibly other components (e.g. an on-chip integrated capacitor and a resistance of the switch) may form an RC resistance that filters the PMIC noise. It is further noted that a configuration of switch S1 (i.e., either open (off) or closed (on)) may be controlled on-chip (i.e., by circuitry on chip 204) or off-chip (circuitry external to chip 204). For example, control module 207 may convey one or more control signals to open switch S1 or close switch S1.

Figure 7:
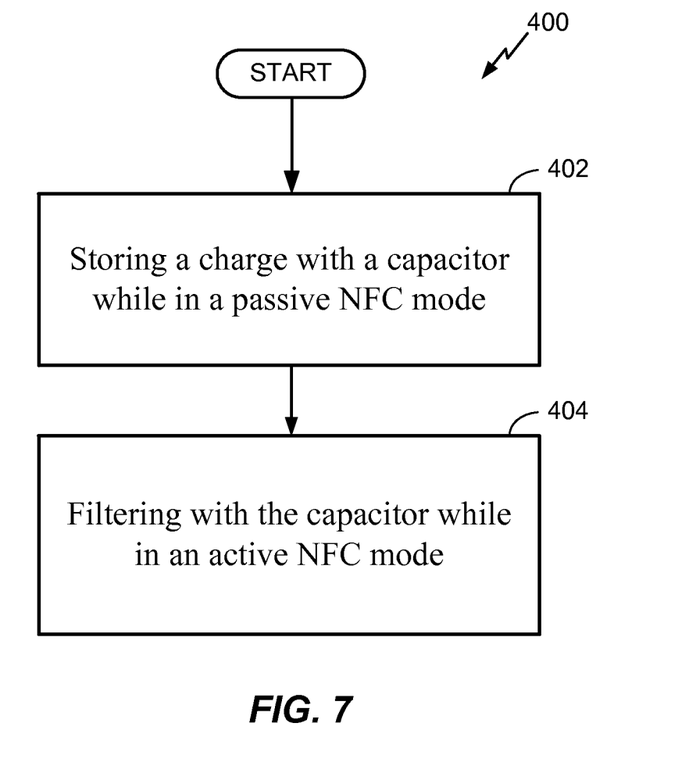
FIG. 7 is a flowchart illustrating a method, according to an exemplary embodiment of the present invention.

FIG. 7 is a flowchart illustrating a method 400, in accordance with one or more exemplary embodiments. Method 400 may include storing a charge with a capacitor while in a passive NFC mode (depicted by numeral 402). It is noted that the capacitor may be external to an integrated circuit, which includes NFC circuitry. Method 400 may also include filtering with the capacitor while in an active NFC mode (depicted by numeral 404).

Figure 8:
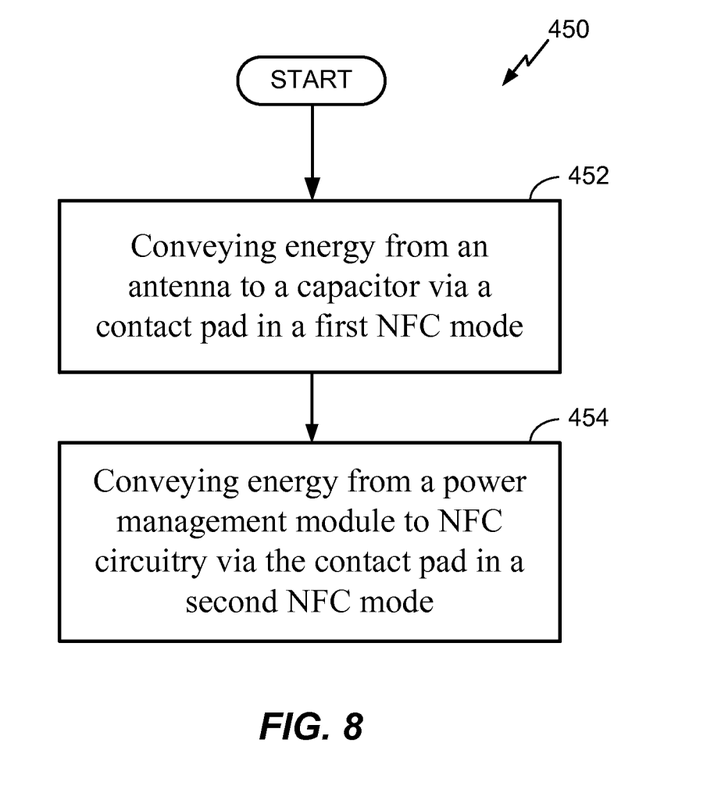
FIG. 8 is a flowchart illustrating another method, according to an exemplary embodiment of the present invention.

FIG. 8 is a flowchart illustrating a method 450, in accordance with one or more exemplary embodiments. Method 450 may include conveying energy from an antenna to a capacitor via a contact pad in a first NFC mode (depicted by numeral 452). Again, it is noted that the capacitor may be external to an integrated circuit, which includes NFC circuitry. Method 450 may also include conveying energy from a power management module to NFC circuitry via the contact pad in a second NFC mode (depicted by numeral 454).

Exemplary embodiments of the present invention, as described herein provide an enhanced transceiver, which may operate in either an active mode of operation or a passive mode of operation. The transceiver includes common circuitry for active and passive modes. More specifically, exemplary embodiments are directed to utilizing a common pad and a common capacitor for active and passive NFC modes. Accordingly, in comparison to conventional NFC transceivers, exemplary embodiments of the present invention provide an enhanced NFC transceiver while reducing the pin count and bill of materials compared to conventional NFC transceivers.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the exemplary embodiments shown herein but is to be accorded the widest scope consistent with the principles and novel features disclosed herein.

What is claimed is:

1. A transceiver, comprising:
a rectifier coupled to a capacitor;
a power management module coupled to the capacitor;
wherein the capacitor is configured as a power supply capacitor in a first mode and a rectifier capacitor in a second, different mode.

2. The transceiver of claim 1, the power management module comprising a power management integrated circuit (PMIC).

3. The transceiver of claim 1, the capacitor configured as the rectifier capacitor in a passive mode and the power supply capacitor in an active mode.

4. The transceiver of claim 1, further comprising a pad coupling the capacitor to an integrated circuit including the rectifier.

5. The transceiver of claim 4, further comprising a pad coupling each of the power management module and the capacitor to an integrated circuit including the rectifier.

6. The transceiver of claim 1, further comprising a switching element configured to be in a closed configuration in the first mode and an open configuration in the second mode.

7. The transceiver of claim 1, the capacitor configured as a filter in an active mode and configured to store charge in a passive mode.

8. A Near Field Communication (NFC) transceiver, comprising:
a capacitor;
a rectifier coupled to the capacitor; and
a power management module coupled to the capacitor, each of the capacitor, the rectifier and the power management module coupled to a switching element for selectively configuring the NFC transceiver for operation in either an active mode or a passive mode.

9. The NFC transceiver of claim 8, the power management module comprising a PMIC.

10. The NFC transceiver of claim 8, the capacitor configured as a filter in the active mode and configured to store charge in the passive mode.

11. The NFC transceiver of claim 8, each of the capacitor and the power management module external to an integrated circuit including the rectifier.

12. The NFC transceiver of claim 11, further comprising a pad for coupling each of the power management module and the capacitor to the integrated circuit.

13. The NFC transceiver of claim 8, the switching element configured to couple the capacitor to NFC circuitry while bypassing a regulator in the active mode.

14. A method, comprising:
storing a charge with a capacitor while in a passive NFC mode; and
filtering with the capacitor while in an active NFC mode.

15. The method of claim 14, the filtering comprising filtering noise with the capacitor while in the active mode.

16. The method of claim 14, further comprising conveying energy to the capacitor via a pad in the passive mode and conveying energy from a power management module to NFC circuitry via the pad in the active mode.

17. The method of claim 14, further comprising closing a switching element to operate in the active mode.

18. The method of claim 14, further comprising opening a switching element to operate in the passive mode.

19. A method, comprising:
conveying energy from an antenna to a capacitor via a contact pad in a first NFC mode; and
conveying energy from a power management module to NFC circuitry from the capacitor via the contact pad in a second NFC mode.

20. The method of claim 19, the conveying energy from an antenna to a capacitor comprising opening a switching element coupled to the capacitor.

21. The method of claim 19, the conveying energy from a power management module to NFC circuitry comprising closing a switching element coupled to the capacitor.

22. A device, comprising:
means for storing a charge with a capacitor while in a passive NFC mode; and
means for filtering with the capacitor while in an active NFC mode.

23. The device of claim 22, further comprising means for conveying energy to the capacitor via a pad in the passive mode and conveying energy from a power management module to NFC circuitry via the pad in the active mode.

24. A device, comprising:
means for conveying energy from an antenna to a capacitor via a pad in a first NFC mode; and
means for conveying energy from a power management module to NFC circuitry from the capacitor via the pad in a second NFC mode.

25. The device of claim 24, further comprising:
means for opening a switching element to convey energy from the antenna to the capacitor; and means for closing the switching element to convey energy from the power management module to the NFC circuitry.

\* \* \* \* \*